Patented Apr. 3, 1923.  1,450,538

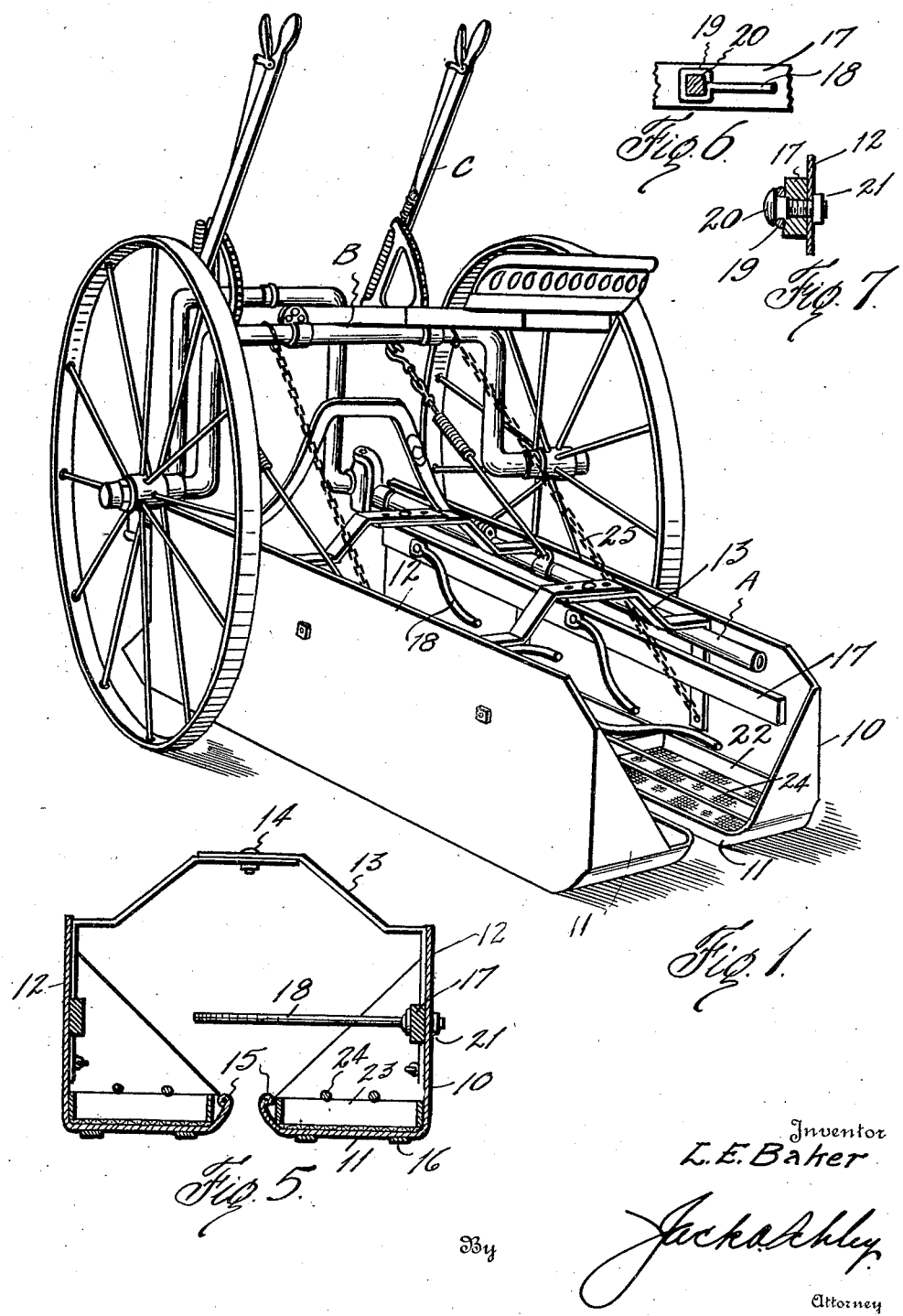

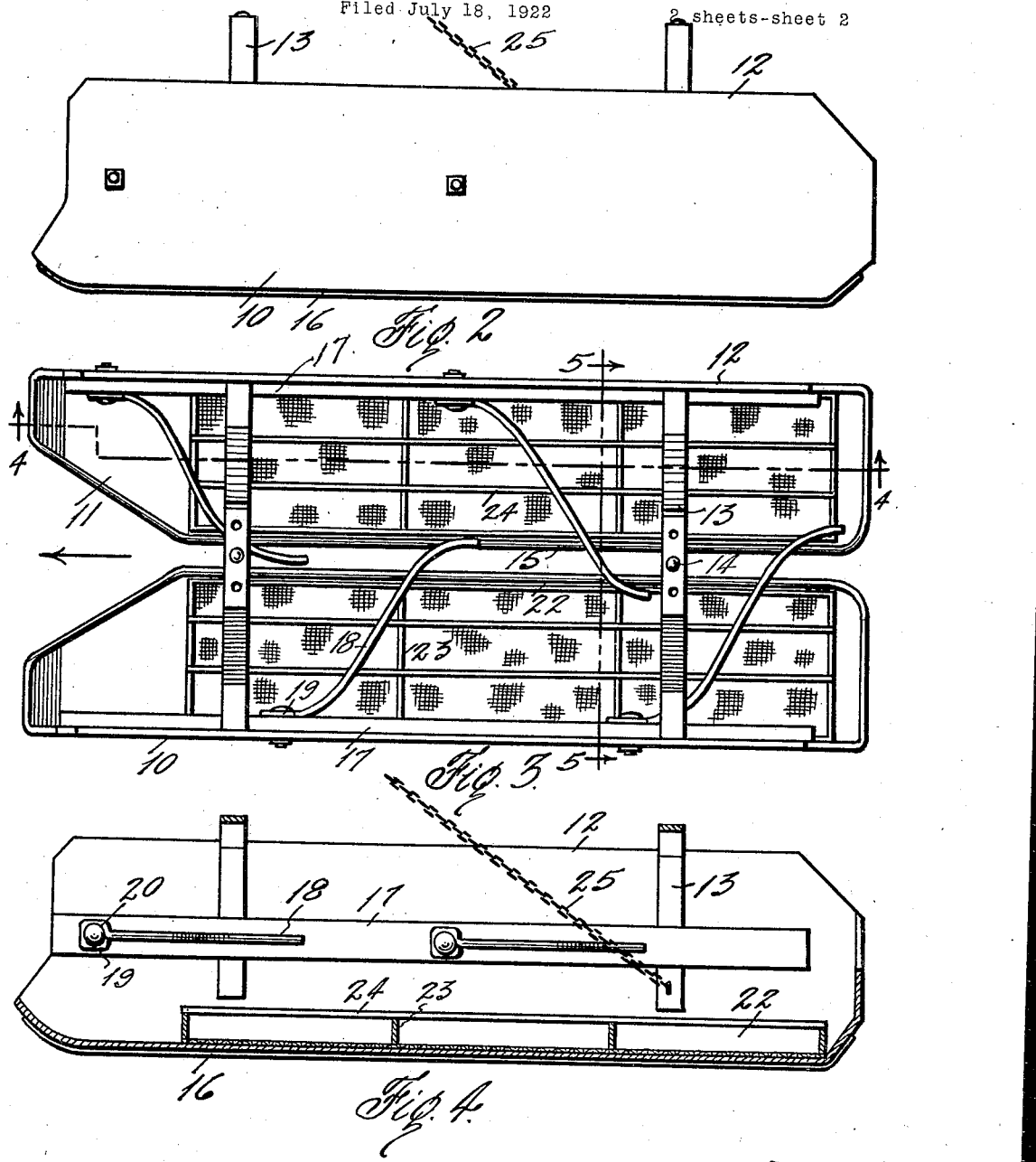

UNITED STATES PATENT OFFICE.

LOUIS E. BAKER, OF BLUM, TEXAS, ASSIGNOR OF ONE-FOURTH TO A. J. MARTIN, ONE-FOURTH TO J. H. BROCK, AND ONE-FOURTH TO A. E. HARROUN, ALL OF BLUM, TEXAS.

INSECT AND WORM CATCHER.

Application filed July 18, 1922. Serial No. 575,832.

*To all whom it may concern:*

Be it known that I, LOUIS E. BAKER, a citizen of the United States, residing at Blum, in the county of Hill and State of Texas, have invented certain new and useful Improvements in Insect and Worm Catchers, of which the following is a specification.

This invention relates to new and useful improvements in insect and worm catchers. It is well known that certain insects, such as boll weevils, infest the green bolls or forms of cotton plants with larvæ which hatch from eggs placed in the bolls by the adult weevil. These feed upon the interior of the bolls after hatching, thus destroying the same. After the adult weevil "stings" the bolls, it seals the same and there is no known method of reaching the eggs or destroying the same except to remove and destroy the boll. The tenacity with which the boll adheres to the plant depends upon its state of decomposition. Also the larvæ or boll worm may cling very tightly to the leaves or stalk or may be buried in the center of the plant.

Experiments have shown that comparatively violent agitation of the plant or bush is necessary to dislodge the infected bolls and worms and some times the weevil itself. Brushes, fingers and resilient arms have been used, but are not efficient because the brushes do not penetrate the plants or come into contact with all the infected bolls and the same is true of the fingers and resilient arms.

It has been demonstrated that if the plant is shaken in a lively manner the infected bolls and clinging pests will be dislodged and repeated operations will clear a field of such insects and worms.

The object of the invention is to provide means for mechanically shaking or agitating the plants in an easy and rapid manner, together with means for gathering or catching the dislodged matter.

A further object is to provide means for first gently agitating the plant and then increasing the agitation as the means passes over the plant, whereby any sudden shock is averted and the plant saved from injury, but finally being given quite a violent shaking before the operation is completed.

A still further object is to control the agitation by shaking the plants from side to side so that the infected bolls and dislodged insects and worms will be more readily caught in receptacles carried at each side of the plant.

Another object of the invention is to provide a device which may be attached to the beams of an ordinary cultivator after the shovels and mountings therefor, have been removed, so that by adjusting the beams vertically with the usual means provided on the cultivator, the catches may be so adjusted.

An important feature of the invention lies in curved substantially rigid arms carried in the path of the plants in staggered relation so that as the plants are bent from side to side, and rebound, they will be deflected from one arm to the following arm. The arms increase in length rearwardly, which increases their lateral projection and consequently the deflection or rebound of the plant is amplified, whereby the agitation is increased and accelerated.

Another important feature resides in removable foraminous trays, whereby the collected bolls, worms and weevils may be removed without removing the oil fluid. These trays are also provided with guards for preventing the agitated plants from brushing out the contents of the trays.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a perspective view of a cultivator showing a catcher attached thereto constructed in accordance with my invention, Fig. 2 is a side elevation of the catcher, Fig. 3 is a plan view of the same, Fig. 4 is a longitudinal vertical sectional view on the line 4—4 of Fig. 3, Fig. 5 is a transverse vertical sectional view on the line 5—5 of Fig. 3, Fig. 6 is a detail of the arm fastening, and Fig. 7 is a sectional detail of the same.

In the drawings the numeral 10 designates a gathering device composed of a pair of opposite pans or receptacles 11, each having an upright outer side wall 12. Transverse yokes 13 have their depending portions suitably secured to the inner faces of the side walls. Each yoke is in two parts and has its upper ends overlapping at the center thereof, the overlapping ends having bolt holes for receiving a bolt 14, whereby the yokes may be adjusted transversely of the pans to space the same with relation to each other. Each yoke is arched at its center to permit the plants to pass freely under the same. A narrow passage is formed between the pans, so that their inner edges pass in close proximity to the stalks.

The front inner ends of the pans are flared outwardly to provide a throat for more readily receiving the plants. The inner edges of the pans are rolled into beads 15 and are transversely curved so as to pass freely on each side of the stalks and close to the same without injuring the stalks. The front under ends of the pans are curved upwardly and spaced longitudinal runners 16 are secured to the inner side of each pan, so that the bottoms of the pans will not drag on the ground and be worn out.

Along the inner side of each wall about midway the height of the same, longitudinal bars 17 are suitably mounted. These bars provide mountings for curved agitating arms 18 which extend horizontally over the pans and are mounted in alternate relation. Each arm has an angular eye 19 at its inner end as is shown best in Fig. 6 for receiving the shouldered portion of a bolt 20 which passes thru the bar and side wall and receives a nut 21 as is shown in Fig. 7.

Each arm is bent in the shape of a reverse curve, the outer free end being directed rearwardly. By observing Fig. 3 it will be seen that the outer ends of the arms overhang the slot between the pans. The forward arm is the shortest and its end terminates over the slot. The arms increase in length rearwardly so as to extend across the slot and overhang the pans. It will be seen that the end of the first arm is well within the device so to permit the plant to be fully over the pans before it is agitated, thereby assuring the catching of all dislodged matter. The arms present a convex curve to the plants whereby the latter are deflected laterally.

The first arm bends or swings the plant to the left, reference being had to the direction of travel, and as the arm rides out of the plant the latter swings to the right over the right hand pan, but quickly rebounds. The rebounding plant is engaged by the second arm which being longer than the first deflects the plant to the left a greater distance than it was swung to the right which causes the plant to increase its amplitude of swing and rebound, whereby it is more violently agitated. As the plant encounters each arm, the added length of the same, will increase the agitation so that at the last arm and immediately in rear of the same, the plant will be given a severe shaking. It will be noted that the agitation of the plant increases gradually as the device passes the same and thus while a severe shaking is finally given the plant, no shock or injury is contributed.

In each pan I arrange a longitudinal tray 22 having a foraminous bottom such as wire screen material. Each tray terminates short of the front and rear ends of its pan, but is long enough to catch the matter dislodged by the arms cross strips 23 are mounted in the trays and guard wires or rods 24 extend longitudinally of the same, resting on top of the strips. These guards are spaced apart and to prevent the leaves and limbs of the rebounding plant from brushing the contents of the trays therefrom. The pans contain a liquid composed of water and kerosene or other suitable oil which rises in the trays. When the trays are removed the liquid drains thru the bottom and the collected matter may be readily dumped and disposed of. The trays are replaced and substantially little of the liquid is lost.

In using the catcher it is preferable to employ a pipe-beam cultivator. As is shown in Fig. 1 the shovels and mountings therefore are removed from the beams A. The yokes 13 are slipped over the beams which rest against each side thereof. Chains or equivalents 25 connected with the rear yoke 13 below the bars 17 extend forwardly and upwardly and have their forward ends connected with the axle B of the cultivator. These serve to hold the catcher on the beams and prevent sagging of the rear end. The cultivator is provided with the usual beam adjusting levers C by operating which the beams are raised and lowered.

The catcher being mounted on the beams A, the cultivator is driven along a row of cotton so that the plants are received between pans 11 and successively engaged by the arms 18 which latter swing the plants from side to side. The plants being thus agitated are freed from weevils, worms and infested bolls, which fall into the trays and are immersed in the liquid. When the trays are full they may be removed and the contents dumped and destroyed.

Various changes in the dimensions and arrangement of the parts as well as alterations, may be made within the scope of the appended claims.

What I claim is:

1. In a catcher of the character described, a pair of longitudinal spaced receptacles, means for supporting the receptacles, and a plurality of rigid agitating arms disposed in alternate relation longitudinally of the pans and overhanging the latter, said arms increasing in length rearwardly of the catcher and having their free ends curved rearwardly.

2. In a catcher of the character described, a pair of longitudinally disposed pans, supports connecting and carrying the pans, sides rising from the outer edges of the pans, and horizontal arms carried by said sides and overhanging said pans, said arms being mounted in alternate relation and having their outer ends curved rearwardly, each successive arm rearwardly being longer than its predecessor.

In testimony whereof I affix my signature.

LOUIS E. BAKER.